United States Patent [19]

Ishizuka et al.

[11] 4,138,522

[45] Feb. 6, 1979

[54] COLOR IMAGE FORMING SYSTEM INCLUDING A LAYER FORMED FROM A DRIED RESIDUE OF A DEVELOPING INK CONTAINING A POLYESTER RESIN BINDER

[75] Inventors: Akio Ishizuka; Akio Miyamoto, both of Fujimiya, Japan

[73] Assignee: Fuji Photo Film Co., Ltd., Minami-ashigara, Japan

[21] Appl. No.: 748,859

[22] Filed: Dec. 9, 1976

Related U.S. Application Data

[63] Continuation of Ser. No. 506,811, Sep. 17, 1974, abandoned.

[51] Int. Cl.[2] ........................ B32B 3/00; B32B 27/06; B32B 27/10; B32B 27/36

[52] U.S. Cl. ........................... 428/195; 260/31.2 XA; 260/32.8 R; 260/33.2 R; 260/33.4 R; 260/33.6 R; 260/40 R; 282/27.5; 428/307; 428/480; 428/481; 428/537

[58] Field of Search ............... 427/146, 145, 150, 161; 428/481, 307, 327, 537, 195, 480; 106/21, 14.5; 260/31.2 XA, 32.8 R, 33.4 R, 33.2 R, 33.6 R; 282/27.5

[56] References Cited

U.S. PATENT DOCUMENTS

| | | | |
|---|---|---|---|
| 3,240,932 | 3/1966 | Haines | 427/146 |
| 3,427,180 | 2/1969 | Phillips | 427/146 |
| 3,451,338 | 6/1969 | Baum | 427/146 |
| 3,476,578 | 11/1969 | Brinckman | 427/146 |
| 3,525,630 | 8/1970 | Phillips | 106/14.5 |
| 3,703,397 | 11/1972 | Cha-Han Lin et al. | 106/14.5 |
| 3,825,432 | 7/1974 | Futaki et al. | 106/21 |
| 3,856,552 | 12/1974 | Deyak | 428/481 |

*Primary Examiner*—Allan Lieberman
*Attorney, Agent, or Firm*—Sughrue, Rothwell, Mion, Zinn and Macpeak

[57] ABSTRACT

A developing ink comprising a developer, a polyester resin binder and a liquid medium. The polyester resin binder is a thermoplastic linear polymeric compound having preferably a molecular weight of about 5,000 to 50,000 and a melting point of about 90 to 170° C.

15 Claims, No Drawings

COLOR IMAGE FORMING SYSTEM INCLUDING A LAYER FORMED FROM A DRIED RESIDUE OF A DEVELOPING INK CONTAINING A POLYESTER RESIN BINDER

The present application is a continuation of U.S. Ser. No. 506,811, filed Sept. 17, 1974, now abandoned.

BACKGROUND OF THE INVENTION

1. Field of the Invention

The present invention relates to a developing ink. More particularly, the present invention relates to a recording sheet or a developer sheet.

2. Description of the Prior Art

A recording sheet is well known in which the reaction of an electron donating colorless organic compound (hereinafter referred to as a color former) with an electron attracting solid acid (hereinafter referred to as a developer) is utilized. For instance, a pressure sensitive paper is described in U.S. Pat. Nos. 2,505,470, 2,505,489, 2,550,471, 2,548,366, 2,712,507, 2,730,456, 2,730,457, 2,972,547, etc.; a heat sensitive paper is described in Japanese Patent Publication No. 4160/1968 and U.S. Pat. No. 2,939,009; and a recording element is described in German Patent Laid Open (OLS) No. 1,939,628.

In these recording sheets, a developer layer is provided on the entire surface of a support and thus a desensitizer must be print-coated on areas of the developer sheet where recording is not desired (see U.S. Pat. No. 2,777,780). However, the method using the desensitizer is disadvantageous in industrially producing the developer sheet in that a coating of the developer and of the desensitizer is required and thus the coating step is complicated.

For the purpose of solving the drawback, a method wherein the developer is print-coated only on the necessary areas of the support, has been proposed and, as a matter of fact, a developing ink containing the developer is commercially available. Generally, the developing ink comprises a developer, a binder for bonding the developer to a support and a solvent to render the ink fluid. Of these ingredients, the binder significantly affects the developing ink.

That is, when a water-soluble binder, e.g., synthetic polymers such as polyvinyl alcohol and polyvinyl pyrrolidone, and natural polymers such as starch, casein and gelatin, which are used in coating the above described developer layer on the entire surface of the support, or an aqueous binder, e.g., a latex such as a styrene-butadiene rubber latex, is print-coated (spot-printed) as a developer ink, the coated areas of the support expand and contract due to water absorption, thereby not only reducing the value of the product, but resulting in the subsequent printing being out of alignment in effecting continuous print-coating. in addition, the use of organic solvent-soluble binders such as a cellulose resin, a vinyl resin, a ketone resin, a polyamide resin and an epoxy resin has been proposed. However, the adhesion of these binders to the support is not sufficient and the developer is easily peeled from the support (formation of picking) and accumulates in a printing plate, an ink blanket and an ink roller (formation of piling).

In addition, these binders considerably reduce the develping ability, and the developing ink permeates into the back of the support and forms color simply on contact with a color former layer before the use thereof (formation of fog). Furthermore, problems arise in that the printing ink (colored ink) is not sufficiently transferred to the coated developer layer and the developer layer turns yellow.

SUMMARY OF THE INVENTION

Accordingly, an object of the present invention is to provide a developing ink which has improved developing ability.

Another object of the present invention is to provide a developing ink which prevents the formation of picking and piling.

A further object of the present invention is to provide a developing ink which does not expand and contract a support.

Still another object of the present invention is to provide a developing ink capable of providing a developer layer to which a printing ink is transferred sufficiently and which does not turn yellow.

An even further object of the present invention is to provide a developing ink which reduces color forming fog.

Another object of the present invention is to provide a partial print coating method for use in providing an excellent developer layer on a support.

These and other objects of the present invention are attained by using a polyester resin as a binder in a developing ink comprising a developer, a medium and a binder.

DETAILED DESCRIPTION OF THE INVENTION

In general, a polyester resin is possibly known as a binder for a coating layer. However, the use of a polyester resin as a binder for a developer layer is not known and particularly the use of the polyester resin as described hereinafter is not known at all.

The polyester resin as used in the present invention is a thermoplastic linear polymeric compound which is produced by the polycondensation of a dicarboxylic acid and dihydric alcohol. Generally, a polyester resin is defined as a polycondensation product of a polycarboxylic acid and polyhydric alcohol, but the polyester resin of the present invention is a polycondensation product of dicarboxylic acid and dihydric alcohol. Particularly, those resins which have a molecular weight of about 5,000 to 50,000 and preferably 15,000 to 25,000, and a melting point of about 90 to 170° C, are preferred.

Polyester resins of the present invention can be used alone or in admixture comprising two or more polyester resins. Alternatively, multi-component based random polyester copolymers which are produced from two or more kinds of dicarboxylic acids and dihydric alcohols, can be used. The polyester resins can be used in combination with other binders, e.g., cellulose derivatives such as nitrocellulose and benzyl cellulose, vinyl polymers such as polyvinyl acetate and polyvinyl chloride or the copolymers thereof, polyamide resins, acrylic resins, maleic acid resins, styrene-butadiene copolymers and the like. In this case, the amount of these other binders which can be employed is equal to or less than the amount of the polyester resin and preferably is not more than about 30% of the total binder amount. Although these other binders are substantially equal to the polyester resin in adhesive strength, these other binders have a strong desensitizing effect on the developing ink and have low light stability. The amount of these other binders can be easily determined by one skilled in the art. It is preferred that the binders other than the polyester resin are selected to satisfy at least one of an average degree of polymerization of about 20 to 5,000 and particularly 40 to 1,000, a melting point or softening point of about 70 to 200° C., an acid value of not more than about 20 and a degree of nitration of about 10 to 14.

Representative examples of dicarboxylic acids which can be used as the acid component of the polyesters of this invention are, e.g., those having 2 to 18 carbon atoms such as oxalic acid, maleic acid, succinic acid, glutaric acid, adipic acid, pimelic acid, suberic acid, azelaic acid, sebacic acid, terephthalic acid, isophthalic acid, phthalic acid, alkoxyterephthalic acid, cyclohexane dicarboxylic acid, xylylene dicarboxylic acid, naphthalene dicarboxylic acid and the like. Representative examples of dihydric alcohols which can be used as the alcohol component of the polyesters of the present invention are, e.g., those having 2 to 50 carbon atoms such as ethylene glycol, propylene glycol, butylene glycol, neopentylene glycol, diethylene glycol, polyethylene glycol, hydroquinone, xylylene diol, and the like.

Production of polyester resin from a carboxylic acid and a dihydric alcohol is well known in the field of polymer chemistry. for example, as disclosed in Murahashi et al, *Synthetic High Molecular Compounds,* Chapter 4, Asakura Shoten, Tokyo, Japan (1971), and the polyester resins of the present invention can be produced using the same methods.

A liquid medium is used in the present invention in which the binder can be dissolved or dispersed (preferably dissolved), and the medium also acts to accelerate the drying of the coated developing ink. An organic solvent is used as the medium and, thus, alcohols such as methyl alcohol, ethyl alcohol, n-propyl alcohol, isopropyl alcohol, n-butyl alcohol, and the like; ketones such as acetone, methyl ethyl ketone, methyl isobutyl ketone, and the like; esters such as ethyl acetate, butyl acetate and the like; aromatic hydrocarbons such as benzene, toluene, xylene, naphtha and the like, glycol ethers such as ethylene glycol monomethyl ether, ethylene glycol monobutyl ether, diethylene glycol ethyl ether, and the like; etc. can be used.

Representative examples of the developers which can be used in the present invention, although described in the above described patents, are clays (such as acid clay, activated clay, attapulgite, kaolin, etc.); organic acids (such as aromatic carboxy compounds, e.g., salicylic acid, aromatic hydroxy compounds, e.g., p-t-butyl phenol, p-t-amyl phenol, o-chlorophenol, m-chorophenol, p-chlorophenol and the like, or the metal salts thereof such as a zinc salt); acidic polymers (such as phenolic resins, e.g., phenol-formaldehyde resin and a phenol-acetylene resin; etc. Developers are described in U.S. Pat. Nos. 3,501,331, 3,669,711, 3,427,180, 3,455,721, 3,516,845, 3,634,121, 3,672,935, 3,732,120, Japanese Patent Application Nos. 48545/1970, 49339/1970, 83651/1970, 84539/1970, 93245/1970, 93246/1970, 93247/1970,, 94874/1970, 109872/1970, 112038/1970, 112039/1970, 112040/1970, 112753/1970, 112754/1970, 118978/1970, 118979/1970, 86950/1971, etc.

The amount of each component contained in the developing ink of the present invention can be varied over a wide range and, it is quite difficult to set forth unequivocably a suitable range. In one aspect, the developer comprises about 10 to 50% by weight, preferably about 15 to 30% by weight; the binder comprises about 5 to 45% by weight, preferably about 15 to 25% by weight; and the liquid medium comprises about 30 to 80% by weight, preferably about 50 to 70% by weight; of the developing ink.

The developing ink of the present invention can contain, if desired, various additives. Suitable additives include a plastizer, e.g., phosphoric ester such as tributyl phosphate, phthalic esters such as dibutyl phthalate, adipic acid esters such as butyl adipate, sebacic acid esters such as dibutyl sebacate, hydrocarbons such as chlorinated paraffin, and glycerides of unsaturated aliphatic acids such as castor oil, etc., e.g., in an amount of about 0.1 to 30% by weight, preferably 1 to 15% by weight, base on the binder; a filler in an amount of about 0.1 to 100% by weight, preferably 0.1 to 50% by weight; and a white pigment in an amount of about 0.1 to 30% by weight, preferably 3 to 15% by weight based on the binder; etc. The filler and white pigment can be selected from silicon oxide, bentonite, barium sulfate, aluminum silicate, colloidal aluminum silicate, zinc silicate, lead silicate, tin silicate, zeolite, kaolin, zinc oxide, magnesium oxide, lead oxide, zinc hydroxide, magnesium hydroxide, zinc carbonate, titanium oxide, calcium carbonate or mixtures thereof. Furthermore, the developing ink can contain a thickener, e.g., powered silicate, aluminum stearate, organic bentonite, oruben, talc, etc. Needless to say, these additives can be added to the developing ink using methods well known in the art.

The developing ink of the present invention can be produced using any method and particularly, a method wherein the polyester resin is dissolved or dispersed in a medium and then the developer is added to the resulting mixture, is preferred.

The thus prepared developing ink is partially print-coated on a support, e.g., paper, plastic sheet, synthetic paper, resin coated paper, etc. A suitable coating amount of the developing ink ranges from about 0.5 to 20 $g/m^2$, preferably 3 to 8 $g/m^2$, more preferably 4 to 6 $g/m^2$.

The print-coating can be applied onto or under the color former layer, or onto the reverse side of the support on which the color former layer is provided.

The developer sheet produced by coating the developing ink of the present invention is used in combination with well known color formers.

The color formers with which the developing ink of the present invention can be used in combination are not particularly limited. Typical examples of color formers which are suitable are triarylmethane based compounds, e.g., 3,3-bis(p-dimethylaminophenyl)-6-dimethylaminophthalide, i.e., Crystal Violet Lactone (hereinafter referred to as CVL), 3,3-bis(p-dimethylaminophenyl)-phthalide, 3-(p-dimethylaminophenyl)-3-(1,2-dimethylindole-3-yl)-phthalide, 3-(p-dimethylaminophenyl)-3-(2-methylindole-3-yl)-phthalide, 3-(p-dimethylaminophenyl)-3-(2-phenylindole-3-yl)-phthalide, 3,3-bis(1,2-dimethylindole-3-yl)-5-dimethylaminophthalide, 3,3-bis(1,2-dimethylindole-3-yl)-6-dimethylaminophthalide, 3,3-bis(9-ethylcarbazole-3-yl)-5-dimethylaminophthalide, 3,3-bis-(2-phenylindole-3-yl)-5-dimethylaminophthalide, 3-p-dimethylaminophenyl-3-(1-methylpyrrole-2-yl)-6-dimethyl-aminophthalide, etc.; diphenylmethane based compounds, e.g., 4,4'-bis-dimethylaminobenzhydrinebenzyl ether, N-halophenyl-Leuco Auramine, N-2,4,5-trichlorophenyl-Leuco Auramine, etc.; xanthene base compounds, e.g., Rhodamine B-anilinolactam, Rhodamine B-p-nitroanilinolactam, Rhodamine B-p-chloroanilinolactam, 7-dimethylamino-2-methoxyfluoran, 7-diethylamino-2-methoxyfluoran, 7-diethylamino-3-methoxyfluoran, 7-diethylamino-3-chlorofluoran, 7-diethylamino-3-chloro-2-methylfluoran, 7-diethylamino-2,2-dimethylfluoran, 7-diethylamino-3-acetylmethylaminofluoran, 7-diethylamino-3'-methylaminofluoran, 3,7-diethylaminofluoran, 7-diethylamino-3-dibenzylaminofluoran, 7-diethylamino-3-methylbenzylaminofluoran, 7-diethylamino-3-chloroethylmethylaminofluoran, 7-diethylamino-3-diethylaminofluoran, etc.; thiazine based compounds, e.g., benzoyl Leucomethylene Blue, p-nitrobenzyl Leucomethylene Blue, etc.; spiro based compounds, e.g., 3-methyl-spiro-dinaphthopyran, 3-ethyl-spiro-dinaphthopyran, 3,3'-dichloro-spiro-dinaphthopyran, 3-benzylspiro-dinaphthopyran, 3-methyl-naphtho-(3-methoxy-benzo)-spiropyran, 3-propyl-spiro-dibenzopyran, etc.; or mixtures thereof.

The color former is dissolved in a solvent and encapsulated, or dispersed in a binder solution and coated on a support. Suitable binders and supports which can be used include those binders and supports hereinbefore described.

As a solvent, natural or synthetic oils can be used alone or in admixtures comprising two or more such oils. Representative examples of solvents which are suitable are cotton seed oil, kerosine, paraffin, naphthene oil, chlorinated biphenyl, chlorinated terphenyl, alkylated biphenyl, alkylated terphenyl, chlorinated paraffin, alkylated naphthalene, and the like. Suitable methods for producing a capsule include a method utilizing coacervation of a hydrophilic colloid sol, as described in U.S. Pat. Nos. 2,800,457 and 2,800,458 and the interfacial polymerization method as described in British Pat. Nos. 867,797, 950,443, 989,264, 1,091,076, etc.

In accordance with the present invention, the developing ability of the developer contained in the ink is substantially the same as the developing ability obtained when the developer is used alone, and the discoloration to a yellow color can be prevented. The ability to prevent the discoloration to yellow is significant in the case of metal salts of aromatic carboxylic acids. Furthermore, the developing ink of the present invention has excellent film forming ability, the coated layer has a high smoothness, and the ink printed on the coated layer has a high transferability. Thus, print-coating is possible which provides the appearance of gloss and sharpness. Furthermore, since picking and piling are substantially completely prevented, the developing ink of the present invention is quite superior to conventional developing inks.

The present invention is illustrated in greater detail by reference to the following examples. All parts, percents, ratios and the like are by weight unless otherwise indicated.

EXAMPLE 1

11 parts of a polyester resin (average molecular weight: 20,000; Tg: 63° C.; MP: 135° C.), 34 parts of ethyl acetate and 10 parts of toluene were ball-milled for 24 hours. Then, 25 parts of acid clay, 4 parts of zinc di-tertiarybutyl salicylate, 4 parts of xylene and 12 parts of methyl isobutyl ketone were added and the resulting mixture was ball-milled for 24 hours to thereby obtain Developing Ink A.

15 parts of a polyester resin (average molecular weight: 20,000; Tg: 63° C.; MP: 135° C.) and 5 parts of nitrocellulose (degree of nitration: 11.5 mol %) were dissolved in 30 parts of ethyl acetate and ball milled for 24 hours. Then, 29 parts of acid clay, 1 part of titanium dioxide, 0.5 parts of micro silica, 2.5 parts of xylene, 17 parts of methyl isobutyl ketone and 4 parts of zinc di-tertiarybutyl salicylate were added and the resulting mixture was ball-milled for 24 hours to thereby obtain Developing Ink B.

20 parts of nitrocellulose (degree of nitration: 11.5 mol %) and 30 parts of ethyl acetate were ball-milled for 24 hours. Then, 29 parts of acid clay, 17 parts of methyl isobutyl ketone, 2.5 parts of xylene, 1 part of titanium dioxide, 0.5 parts of micro silica and 4 parts of zinc di-tertiary-butyl salicylate jwere added and the resulting mixture was ball-milled for 24 hours to thereby obtain Developing Ink C for comparison.

Developing Inks A, B and C were print-coated on a paper in various amounts to produce developer sheets.

A color former sheet was produced by micro-encapsulating Crystal Violet Lactone in accordance with the method described in U.S. Pat. No. 2,800,457 followed coating the microcapsules on a paper.

The developer sheet and the color former sheet were superposed under a load of 600 $Kg/cm^2$ to thereby cause color formation. The density at 610 mμ 5 minutes after the color formation is shown in Table 1.

Table 1

| Amount of Developing Ink Coated ($g/m^2$) | Developed Color Density | | |
|---|---|---|---|
| | Developing Ink A | Developing Ink B | Developing Ink C |
| 2 | 0.65 | 0.70 | 0.40 |
| 3 | 0.70 | 0.75 | 0.50 |
| 4 | 0.74 | 0.78 | 0.58 |
| 5 | 0.85 | 0.90 | 0.61 |
| 6 | 0.93 | 0.95 | 0.66 |
| 7 | 1.00 | 1.04 | 0.72 |

As is apparent from the results in Table 1, the developed color densities with the developing inks of the present invention (Developing Inks A and B) are higher by about 50% than the developed color density obtained with the comparative developing ink (Developing Ink C) wherein nitrocellulose was used. This phenomenon is considered to be due to the fact that the polyester resin decreases the desensitizing action and increases the developing ability while at the same time reducing developed fog as compared with the nitrocellulose.

Furthermore, the developer sheet coated in an amount of 5 $g/m^2$ was measured with regard to (1) developed color density one day after color formation (2) color density after exposure to ultraviolet light for 2 hours after color formation (light stability) and (3) color density at the white background areas (discoloration to yellow). Also, the density (stability with time) was measured after exposing the developer sheet to ultraviolet light for 2 hours before color formation and then causing color formation. The results obtained are shown in Table 2.

Table 2

| Developing Ink | Developed Color Density | Light Stability | Discoloration to Yellow | Stability with Time |
|---|---|---|---|---|
| A | 0.84 | 0.72 | 78 | 0.79 |
| B | 0.92 | 0.78 | 70 | 0.86 |
| C | 0.60 | 0.38 | 60 | 0.48 |

Furthermore, with regard to water resistance of the developed color image and resistance to printing of developing ink, Developing Inks A and B were excellent while Developing Ink C was quite inferior. Particularly, the water resistance of Developing Ink C was so unsatisfactory that it was not practically usable.

While the invention has been described in detail and with reference to specific embodiments thereof, it will be apparent to one skilled in the art that various changes and modifications can be made therein without departing from the spirit and scope thereof.

What is claimed is:

1. A color image forming system comprising the components (a) an electron donating color former; and (b) an electron accepting color developer, wherein said component (b) is in the form of a layer on a support, said layer being the dried residue of a coating of a developing ink comprising (i) an electron accepting developer;

(ii) a thermoplastic linear polyester resin binder comprising the condensation product of at least one dicarboxylic acid having 2 to 18 carbon atoms and at least one dihydric alcohol having from 2 to 50 carbon atoms and having a molecular weight of about 5,000 to 50,000 and a melting point of about 90 to 170° C.; and (iii) a liquid medium selected from the group consisting of an alcohol, an ester, an aromatic hydrocarbon and a glycol ether, said ink comprising about 10 to 50% by weight of said developer, about 5 to 45% by weight of said polyester resin binder and about 30 to 80% by weight of said liquid medium.

2. The color image forming system of claim 1, wherein the developer is a clay, an organic acid, an acid polymer or a mixture thereof.

3. The color image forming system of claim 1, wherein said ink includes a cellulose derivative, a vinyl polymer, polyamide resin, an acrylic resin, a maleic acid resin, or a styrenebutadiene copolymer as a binder with the amount being not more than about 30% of the total binder content.

4. The color image forming system of claim 1, wherein said dicarboxylic acid is oxalic acid, maleic acid, succinic acid, glutaric acid, adipic acid, pimelic acid, suberic acid, azelaic acid, sebacic acid, terephthalic acid, isophthalic acid, phthalic acid, alkoxyterephthalic acid, cyclohexane dicarboxylic acid, xylylene dicarboxylic acid, or naphthalene dicarboxylic acid and wherein said dihydric alcohol is ethylene glycol, propylene glycol, butylene glycol, neopentylene glycol, diethylene glycol, polyethylene glycol, hydroquinone, or xylylene diol.

5. The color image forming system of claim 1, wherein said liquid medium is methyl isobutyl ketone.

6. The color image forming system in claim 1, wherein said developer is a clay, an organic carboxylic acid, an aromatic hydroxy compound, a metal salt of an aromatic hydroxy compound or an acidic polymer.

7. The color image forming system of claim 1, wherein said developing ink includes at least one of a plasticizer, a filler, or a white pigment.

8. The color image forming system of claim 1, wherein said system is in the form of a support having (i) component (b) as a layer upon a layer of component (a) which is coated upon said support;

(ii) component (a) as a layer upon a layer of component (b) which is coated upon said support; or (iii) component (a) as a layer upon said support and component (b) as a layer upon the reverse side of said support.

9. The color image forming system of claim 8, wherein said color former component (a) is encapsulated.

10. The color image forming system of claim 8, wherein said color former component (a) comprises a color former dispersed in a binder.

11. The color image forming system of claim 1, wherein said coating on a support of a developing ink is a partial coating.

12. The color image forming system of claim 1, wherein said polyester resin has a molecular weight of 15,000 to 25,000.

13. The color image forming system of claim 1, wherein the coating amount of said developing ink is from about 0.5 to 20 $g/m^2$.

14. The color image forming system of claim 13, wherein said coating amount is 3 to 8 $g/m^2$.

15. The color image forming system of claim 14, wherein said coating amount is 4 to 6 $g/m^2$.

* * * * *